(12) United States Patent
Tanaka et al.

(10) Patent No.: US 12,476,024 B2
(45) Date of Patent: Nov. 18, 2025

(54) SUPERCONDUCTING WIRE, METHOD FOR MANUFACTURING SUPERCONDUCTING WIRE, AND MRI DEVICE (71) Applicant: HITACHI, LTD., Tokyo (JP)

(72) Inventors: Hideki Tanaka, Tokyo (JP); Takaaki Suzuki, Tokyo (JP); Motomune Kodama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 828 days.

(21) Appl. No.: 17/785,142

(22) PCT Filed: Sep. 3, 2020

(86) PCT No.: PCT/JP2020/033426
§ 371 (c)(1),
(2) Date: Jun. 14, 2022

(87) PCT Pub. No.: WO2021/131166
PCT Pub. Date: Jul. 1, 2021

(65) Prior Publication Data
US 2023/0008754 A1 Jan. 12, 2023

(30) Foreign Application Priority Data
Dec. 26, 2019 (JP) .................. 2019-235787

(51) Int. Cl.
*H01B 12/10* (2006.01)
*B21C 1/02* (2006.01)
(Continued)

(52) U.S. Cl.
CPC .............. *H01B 12/10* (2013.01); *B21C 1/02* (2013.01); *B22F 3/16* (2013.01); *B22F 5/12* (2013.01);
(Continued)

(58) Field of Classification Search
CPC .................. H01B 12/10; B21C 1/02
See application file for complete search history.

(56) References Cited

U.S. PATENT DOCUMENTS

| 2002/0198111 A1* | 12/2002 | Tomsic | H10N 60/0856 29/599 |
| 2003/0036482 A1* | 2/2003 | Thieme | H10N 60/0856 505/100 |
| 2017/0186535 A1* | 6/2017 | Hahn | G01R 33/3802 |

FOREIGN PATENT DOCUMENTS

| JP | 2004-111203 A | 4/2004 |
| JP | 2008-091325 A | 4/2008 |
| JP | 2016-126950 A | 7/2016 |

OTHER PUBLICATIONS

Hideki Tanaka et al., "Tensile and Bending Stress Tolerance on Round MgB2 Wire Made By In Situ PIT Process", IEEE Transactions On Applied Superconductivity, vol. 28, No. 4, Jun. 2018.
(Continued)

*Primary Examiner* — Paul A Wartalowicz
(74) *Attorney, Agent, or Firm* — MATTINGLY & MALUR, PC (57) ABSTRACT

A superconducting wire comprises a $MgB_2$ filament, a base material, a high-thermal expansion metal, and a stabilizing material. The high-thermal expansion metal is a metal (for example, stainless steel) having a higher thermal expansion coefficient at room temperature than the $MgB_2$ and the base material (for example, iron or niobium). The manufacturing method includes a step of packing a mixed powder in a first metal pipe, a step of performing wire-drawing on the first metal pipe formed of the metal to be the base material, a step of producing a composite wire by accommodating the first metal pipe in a second metal pipe formed of the high-thermal expansion metal and the stabilizing material, a step of
(Continued)

performing wire-drawing on the composite wire, and a step of performing heat treatment.

14 Claims, 4 Drawing Sheets

(51) Int. Cl.
    *B22F 3/16*           (2006.01)
    *B22F 5/12*           (2006.01)
    *B22F 7/04*           (2006.01)
    *G01R 33/3815*    (2006.01)
    *H01B 1/02*           (2006.01)
    *H01F 6/06*           (2006.01)

(52) U.S. Cl.
    CPC ............ *B22F 7/04* (2013.01); *G01R 33/3815* (2013.01); *H01B 1/02* (2013.01); *H01F 6/06* (2013.01); *B22F 2302/05* (2013.01)

(56) References Cited

OTHER PUBLICATIONS

International Search Report of PCT/JP2020/033426 dated Oct. 13, 2020.

* cited by examiner

SUPERCONDUCTING WIRE, METHOD FOR MANUFACTURING SUPERCONDUCTING WIRE, AND MRI DEVICE

TECHNICAL FIELD

The invention relates to a superconducting wire using magnesium diboride ($MgB_2$), a method for manufacturing the superconducting wire, and a magnetic resonance imaging (MRI) device.

BACKGROUND ART

An MRI device includes a superconducting coil formed by winding a superconducting wire to generate a strong and stable magnetic field. Although a copper wire coil typically has an allowable current of approximately several amperes per square millimeters, the superconducting coil using a superconductor allows a current of several hundred amperes per millimeters to flow therethrough and thus stably gives a high magnetic field even if it has a small frame.

In the past, a wire of niobium-titanium (NbTi) being a low temperature superconductor has been widely used for the superconducting coil. Since the superconducting coil using the NbTi wire has a low operating temperature, approximately 4 K, liquid helium is mainly used for cooling the superconducting coil. However, tight supply and demand of liquid helium is recently concerned, and thus a superconductor having high critical temperature and requiring no liquid helium has been actively developed.

Known superconductors having high critical temperature include niobium tin ($Nb_3Sn$), bismuth based oxide, yttrium based oxide, and magnesium diboride ($MgB_2$). $MgB_2$ has a high critical temperature of approximately 39 K, relatively easy material availability, a small magnetic anisotropy, light weight, and excellent mechanical properties. $MgB_2$ is therefore expected to be used for various applications.

A method for manufacturing the superconducting coil using a metal-based superconductor is roughly classified into a wind and react method and a react and wind method. In the wind and react method, a superconducting wire precursor is wound in a coil and then subjected to heat treatment. In the react and wind method, a superconducting wire is subjected to heat treatment and then wound into a coil.

As well known, the superconducting wire using $MgB_2$ has a reversible bending radius, and is thus reduced in superconducting properties when being bent at a large curvature. If the superconducting wire using $MgB_2$ is greatly bent at a radius smaller than the reversible bending radius during being wound into a coil shape or routed, critical current or critical current density is extremely reduced, which restricts, for example, production of a superconducting magnet using the superconducting wire.

Patent Literature 1 describes a superconducting multi-filament wire, in which Cu is located at the center, as a superconducting wire using a $MgB_2$ filament (see FIG. 1 in Patent Literature 1). Patent Literature 1 further describes a superconducting multi-filament wire, in which a barrier separates each filament from Cu (see FIG. 2 in Patent Literature 1). As described in Patent Literature 1, a typical superconducting wire using $MgB_2$ has a multi-filament wire structure, in which a plurality of $MgB_2$ filaments are covered with a sheath.

Nonpatent Literature 1 describes that when a tensile load or a bending load is applied to a $MgB_2$ wire at room temperature, irreversible strain is approximately 0.2%. Deterioration in superconducting properties associated with bending of a wire is considered to occur when a tensile load is applied to a bending outer-side until the irreversible tensile strain is exceeded.

CITATION LIST

Nonpatent Literature

[Patent Literature 1] Japanese Unexamined Patent Application Publication No. 2008-091325.

Nonpatent Literature

[Nonpatent Literature 1] Hideki Tanaka et al., "Tensile and Bending Stress Tolerance on Round $MgB_2$ Wire Made by In Situ PIT Process", IEEE TRANSACTIONS ON APPLIED SUPERCONDUCTIVITY, VOL. 28, NO. 4, JUNE 2018.

SUMMARY OF INVENTION

Technical Problem

When a wire is bent, strain occurs in proportion to a distance from the neutral axis of bending. Hence, when a $MgB_2$ filament is disposed at the center of a superconducting wire, or when a $MgB_2$ filament is narrowed, the reversible bending radius of a superconducting wire using the $MgB_2$ filament can be reduced. Such a reduction in reversible bending radius prevents the critical current density from being significantly reduced even if the superconducting wire is bent at a small radius, resulting in an increase in degree of freedom of winding or routing.

However, disposition of a $MgB_2$ filament at the center of a superconducting wire or narrowing of a $MgB_2$ filament reduces the filling factor of a superconductor with respect to the sectional area of the superconducting wire. Such a reduction in filling factor of a superconductor leads to smaller critical current over the whole superconductor including a straight portion, and thus such disposition or narrowing of the filament is not an effective measure to reduce the reversible bending radius.

Specifically, a superconducting coil in a solenoid shape or a racetrack shape is used in an application device such as a superconducting magnet. In case of such a coil shape, a winding portion of the coil has a bending radius having a value being approximately constant and relatively large. Meanwhile, a lead-out portion, through which an end of the superconducting wire is led out from the winding portion, must be greatly bent in many cases.

For example, when the superconducting coil is joined to an electrode or another coil, the superconducting wire led out from the lead-out portion of the coil is desirably greatly bent in a certain direction such as an axial direction of the coil. The led-out superconducting wire is thus bent at a bending radius smaller than that of the winding portion of the superconducting coil in a direction different from the winding direction of the winding portion. Hence, a region near the lead-out portion of the coil particularly tends to be reduced in superconducting properties.

Although the superconducting wire led out from the lead-out portion of the coil is possibly bent at a bending radius similar to that of the winding portion, such routing requires a wide space. If the superconducting wire has a large reversible bending radius and thus cannot be bent at a small bending radius, size of an application device using the superconducting wire is problematically increased, and a shape or joint of the superconducting coil is limited.

In an MRI device or the like, since a temporally stable, high magnetic field is required, a plurality of superconducting coils are superconductively joined together. In a method for superconductively joining between superconducting wires each using a $MgB_2$ filament, $MgB_2$ to be a joint portion for connecting between the wires is formed by sintering. An end of each superconducting wire is inserted into a joining container, and material powder is packed into between the ends in the container and subjected to heat treatment, thereby a joint portion via a $MgB_2$ bulk is formed.

For such joining operation, an inhibitor such as copper that blocks generation of $MgB_2$ must be removed before heat treatment. For existing superconducting wires as described in Patent Literature 1, however, since copper as a stabilizing material is disposed near the center with respect to a superconductor, while thermal stability of the superconductor is ensured, removability of copper being an inhibitor is deteriorated. For such a structure, it is difficult to remove the stabilizing material by chemical polishing or mechanical polishing while remaining $MgB_2$ filaments during superconducting joint making.

An object of the invention is therefore to provide a superconducting wire using $MgB_2$, which allows bending radius to be reduced to a practical value without greatly reducing a critical current and can achieve the removability of an inhibitor during superconducting joint making and thermal stability of a superconductor together, a method for manufacturing the superconducting wire, and an MRI device including the superconducting wire.

Solution to Problem

To achieve the object, a superconducting wire according to the invention includes a filament formed of $MgB_2$, a base material covering the periphery of the filament, a high-thermal expansion metal covering the periphery of the base material, and a stabilizing material covering the periphery of the high-thermal expansion metal and stabilizing superconductivity. The high-thermal expansion metal has a higher thermal expansion coefficient at room temperature than the $MgB_2$ and the base material.

A method for manufacturing a superconducting wire according to the invention includes a step of packing a mixed powder being a mixture of magnesium powder and boron powder into a first metal pipe, a step of performing wire-drawing on the first metal pipe filled with the mixed powder, a step of producing a composite wire by accommodating the first metal pipe subjected to the wire-drawing in a second metal pipe, a step of performing wire-drawing on the composite wire, and a step of generating $MgB_2$ by performing heat treatment on the composite wire subjected to the wire-drawing. The first metal pipe is formed of a metal to be a base material of the superconducting wire. The second metal pipe is a composite pipe including a high-thermal expansion metal layer formed of a high-thermal expansion metal and a stabilizing layer formed of a stabilizing material covering the periphery of the high-thermal expansion metal layer, or a multiple pipe including a high-thermal expansion metal pipe formed of the high-thermal expansion metal accommodated in a stabilizing material pipe formed of the stabilizing material. The high-thermal expansion metal has a higher thermal expansion coefficient at room temperature than the $MgB_2$ and the metal to be the base material.

An MRI device according to the invention includes the superconducting wire.

Advantageous Effects of Invention

According to the invention, it is possible to provide a superconducting wire using $MgB_2$, which allows bending radius to be reduced to a practical value without greatly reducing a critical current and can achieve removability of an inhibitor during superconducting joint making and thermal stability of a superconductor together, a method for manufacturing the superconducting wire, and an MRI device including the superconducting wire.

DESCRIPTION OF EMBODIMENT

Hereinafter, a superconducting wire, a method for manufacturing the superconducting wire, and an MRI device including the superconducting wire according to one embodiment of the invention are described with reference to drawings. In the drawings, a common configuration is designated by the same reference numeral or sign, and duplicated description is omitted.

Superconducting Wire

Figure 1:
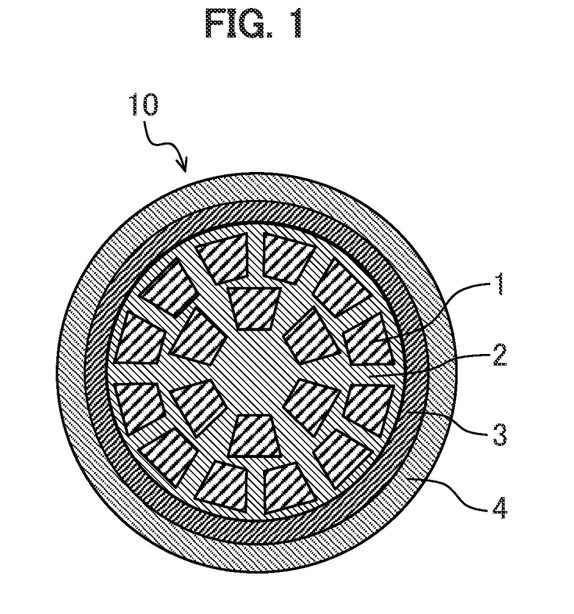
FIG. 1 is a sectional diagram schematically illustrating a superconducting wire according to an embodiment of the invention.

FIG. 1 is a sectional diagram schematically illustrating a superconducting wire according to an embodiment of the invention. As illustrated FIG. 1, the superconducting wire 10 of this embodiment includes a $MgB_2$ filament 1, a base material 2 forming a core together with the filament 1, a high-thermal expansion metal 3 that forms a sheath covering the core and applies compressive residual stress to the filament 1, and a stabilizing material 4 that also forms the sheath covering the core and stabilizes superconductivity of the filament 1.

The filament 1 is formed of $MgB_2$ being a superconductor. The $MgB_2$ filament 1 is formed by a Powder In Tube (PIT) method. In the PIT method, material powder is packed in a metal pipe, and the metal pipe is subjected to wire-drawing to produce a wire. Since the filament 1 is formed using the PIT method, most of the base material 2 is formed of the undepicted metal pipe accommodating the filament 1.

The PIT method includes an ex situ method and an in situ method. In the ex situ method, $MgB_2$ is packed in a metal pipe, and the metal pipe is subjected to wire-drawing, and then the metal pipe filled with $MgB_2$ is subjected to heat treatment as necessary. In the in situ method, magnesium powder and boron powder being raw materials are packed in a metal pipe, and the metal pipe is subjected to wire-drawing, and then the metal pipe filled with the raw materials is subjected to heat treatment to generate $MgB_2$.

Although either of the ex situ method and the in situ method may be used as a method for forming the $MgB_2$ filament 1, the in situ method is preferably used. The in situ method can generate $MgB_2$ having many intercoupling sites by heat treatment at a relatively low temperature. Sintering $MgB_2$ at low temperature increases density of grain boundaries to be pinning centers, making it possible to increase the critical current density of the superconducting wire 10.

The filament 1 can contain an impurity element such as carbon in addition to $MgB_2$. When an additive such as a carbon source is added to material powder during production of the filament 1, B of $MgB_2$ can be subjected to element substitution to increase critical current or a critical magnetic field. A usable carbon source includes inorganic carbon compounds such as $B_4C$ and $SiC$, hydrocarbon such as benzene, naphthalene, coronene, and anthracene, organic acids such as stearic acid, and magnesium salts of organic acids.

The base material 2 is provided so as to cover the periphery of the filament 1 over the length of the superconducting wire 10. The base material 2 supports the filament 1 and provides some mechanical strength to the superconducting wire 10. The base material 2 is mostly formed of a metal pipe, and the metal pipe serves as a barrier material to obstruct an inhibitor, which blocks generation of $MgB_2$, during heat treatment for generating $MgB_2$. The metal pipe to be the base material 2 is formed of a metal, which is less likely to react with Mg and B, to suppress a reaction of Mg or B being a raw material and the inhibitor such as copper.

The base material 2 can be formed of iron, niobium, tantalum, nickel, titanium, or an alloy of such a metal. Each of such metals is less likely to react with Mg or B, and thus can serve as a barrier material without blocking generation of $MgB_2$. Iron or niobium is preferable as a material of the base material 2. Iron or niobium is good in workability and relatively inexpensive, and thus provides a metal pipe suitable for wire-drawing at low cost.

The high-thermal expansion metal 3 is provided to cover the periphery of the base material 2 over the length of the superconducting wire 10. The high-thermal expansion metal 3 has a higher thermal expansion coefficient at room temperature than $MgB_2$ and the base material 2. Such a high thermal expansion coefficient is preferably maintained from the temperature of heat treatment for generating $MgB_2$ to room temperature or even to a very low temperature equal to or lower than the critical temperature of $MgB_2$. When the high-thermal expansion metal 3 is used for the sheath covering the core, compressive force caused by a thermal expansion difference is applied to the core after the heat treatment for generating $MgB_2$, thereby residual compressive strain can be applied to the filament 1.

It is generally considered that when a tensile load is exerted on a $MgB_2$ wire beyond the irreversible tensile strain so that a crack occurs in the $MgB_2$ filament, the superconducting properties are deteriorated. When a $MgB_2$ filament is cooled to room temperature or to the critical temperature or lower after the heat treatment, the $MgB_2$ filament receives residual compressive strain corresponding to such temperature. Hence, size of the irreversible tensile strain, which means a limit to what the superconducting properties are not reduced, depends on temperature change after the heat treatment or the thermal expansion coefficient of a constituent material.

The temperature change occurring in the $MgB_2$ wire after the heat treatment is expressed as a temperature difference T2−T1 between heat treatment temperature T1 for $MgB_2$ generation and room temperature T2 to which the wire is cooled after the heat treatment, or a temperature difference T3−T1 between the heat treatment temperature T1 for $MgB_2$ generation and a very low temperature T3 equal to or lower than the critical temperature to which the wire is cooled after the heat treatment. The thermal expansion coefficient (linear expansion coefficient) is roughly determined by material depending on temperatures.

When the superconducting wire using the $MgB_2$ filament is cooled from the heat treatment temperature T1 [K] to the room temperature T2 [K], residual compressive strain ε_pre-comp occurring in the $MgB_2$ filament can be expressed by Numerical Formula (I) assuming influence of the longitudinal elasticity modulus and sectional area of the filament or another constituent material is ignored.

$$\varepsilon\_pre\text{-}comp = (\alpha\_sheath - \alpha\_MgB_2) \times (T2 - T1) \quad (I)$$

In the Formula, $\alpha\_MgB_2$ represents thermal expansion coefficient [$K^{-1}$] of $MgB_2$, and $\alpha$_sheath represents volume-average thermal expansion coefficient of a constitutional material of the sheath. A positive number of ε_pre-comp indicates tensile strain, while a negative number of ε_pre-comp indicates compressive strain. Since $\alpha$_sheath is typically larger than $\alpha\_MgB_2$, ε_pre-comp is typically a negative number. When the $MgB_2$ filament is under restrain, residual compressive stress is generated in correspondence to the residual compressive strain.

A certain size of irreversible tensile strain, below which the superconducting properties are not deteriorated, is in general considered to be similar to size of the residual compressive strain occurring after the heat treatment. If the superconducting wire is tensioned during being wound into a coil shape or routed, tensile strain occurs. If the superconducting wire is bent, tensile strain occurs on the outer side of bending while compressive strain occurs on the inner side of bending. Tensile strain accordingly occurs in the filament, and if such tensile strain exceeds the residual compressive strain, a defect such as a crack probably occurs and deteriorates the superconducting properties.

Hence, a measure to add a large residual compressive strain to the $MgB_2$ filament could be effective in order to reduce the reversible bending radius of the superconducting wire using the $MgB_2$ filament and prevent the superconducting properties from being deteriorated along with bending. When the heat treatment temperature T1 for $MgB_2$ generation and the temperature (normal temperature T2 or very low temperature T3), to which the wire is cooled after the heat treatment, are each under a predetermined condition, a large $\alpha$_sheath value is required.

In general, an iron pipe or a niobium pipe is used as a metal pipe to be filled with $MgB_2$ material powder. However, the thermal expansion coefficient of pure iron is small, approximately $12 \times 10^{-6} \, °C^{-1}$, at room temperature. The thermal expansion coefficient of niobium is also small, approximately $7 \times 10^{-6} \, °C^{-1}$, at room temperature. Through investigations, the inventors have found that using only pure iron for the sheath covering the $MgB_2$ filament causes insufficient residual compressive strain in the filament after the heat treatment.

The $MgB_2$ filament is typically stabilized by, for example, copper to prevent quench or thermal runaway. The thermal expansion coefficient of copper is relatively large, approximately $17 \times 10^{-6} \, °C^{-1}$, at room temperature. However, copper is annealed during the heat treatment for generating $MgB_2$. Even if copper is used for the sheath covering the MgB$_2$ filament, insufficient residual compressive strain occurs in the filament after the heat treatment.

On the other hand, as illustrated in FIG. 1, when the high-thermal expansion metal 3 is used for the sheath covering the MgB$_2$ filament 1, compressive force is exerted on the core after the heat treatment for generating MgB$_2$, and thus residual compressive strain is added to the MgB$_2$ filament 1. Such increase in residual compressive strain expands the irreversible tensile strain of the filament 1, and thus the reversible bending radius of the superconducting wire 10 can be made small compared with an existing structure.

For example, when only pure iron is used for the sheath covering the MgB$_2$ filament, the volume-average thermal expansion coefficient α_sheath of the constitutional material of the sheath is approximately $12\times10^{-6°}$ C.$^{-1}$. A value of ε_pre-comp is −0.23% assuming the thermal expansion coefficient α_MgB$_2$ of MgB$_2$ is $8\times10^{-6°}$ C.$^{-1}$, the heat treatment temperature T1 is 600° C., and the room temperature T2 is 30° C.

On the other hand, when the high-thermal expansion metal 3 having a thermal expansion coefficient of $14\times10^{-6°}$ C.$^{-1}$ is used for the sheath covering the MgB$_2$ filament, the volume-average thermal expansion coefficient α_sheath of the constitutional material of the sheath increases to $13\times10^{-6°}$ C.$^{-1}$. In such a case, ε_pre-comp is −0.28%. This result means that the irreversible tensile strain of the MgB$_2$ filament increases from 0.23% to 0.28%.

The thermal expansion coefficient at room temperature of the high-thermal expansion metal 3 is preferably higher than the thermal expansion coefficient of pure iron or copper-nickel alloy such as Monel, and is preferably $14.0\times10^{-6°}$ C.$^{-1}$ or more, more preferably $14.5\times10^{-6°}$ C.$^{-1}$ or more, and further preferably $15.0\times10^{-6°}$ C.$^{-1}$ or more. Such a high thermal expansion coefficient is preferably maintained from the temperature of heat treatment for generating MgB$_2$ to room temperature or even to a very low temperature equal to or lower than the critical temperature of MgB$_2$. When the high thermal expansion coefficient is high, a large compressive strain can be added to the filament 1 covered with the base material 2 due to a thermal expansion difference, and thus the reversible bending radius of the superconducting wire 10 can be reduced.

Stainless steel is preferably used as the high-thermal expansion metal 3. Stainless steel is inexpensive and easily available, and thus allows material cost of the superconducting wire 10 to be reduced. Any appropriate type of stainless steel can be used as long as it has a higher thermal expansion coefficient than MgB$_2$ and the base material 2, and maintains certain workability.

Specific examples of stainless steel having higher thermal expansion coefficient at room temperature than MgB$_2$ and the base material 2 include SUS 301, SUS 301L, SUS 304, SUS 304L, SUS 310S, SUS 316, and SUS 316L. Such stainless steel has good ductility and thus can be easily subjected to wire-drawing during manufacturing of the superconducting wire 10. The stainless steel preferably has a low content of inhibitors blocking generation of MgB$_2$, more preferably includes SUS 301, SUS 301L, SUS 304, and SUS 304L. The Ni content of the stainless steel is preferably 10 mass % or less.

The stabilizing material 4 is provided so as to cover the periphery of the high-thermal expansion metal 3 over the length of the superconducting wire 10. The stabilizing material 4 is a good conductor having a low resistivity and a high heat conductivity, and thermally stabilizes superconductivity of the filament 1 and suppresses quench and thermal runaway of a superconductor. The stabilizing material 4 can be formed of copper, aluminum, silver, gold, or an alloy of such a metal. Material of the stabilizing material 4 preferably includes copper, more preferably oxygen-free copper.

As illustrated in FIG. 1, the stabilizing material 4 is disposed on the outer side with respect to the filament 1. Copper is preferably not disposed near the center with respect to the filament 1. Such arrangement makes it possible to easily remove copper, which blocks generation of MgB$_2$, by chemical polishing or mechanical polishing while remaining the filament 1 during making superconducting joint of the superconducting wire 10. As a result, removability of the inhibitor during superconducting joint making and thermal stability of a superconductor can be achieved together.

Figure 2:
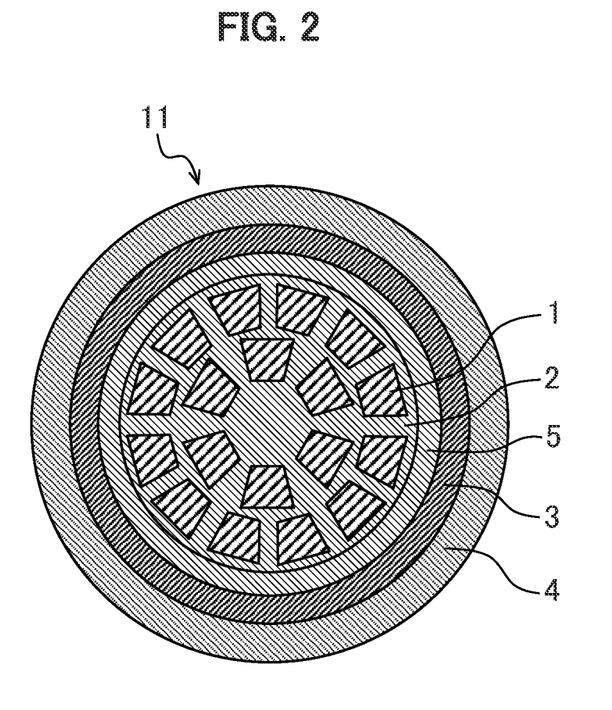
FIG. 2 is a sectional diagram schematically illustrating a superconducting wire according to a modification.

FIG. 2 is a sectional diagram schematically illustrating a superconducting wire according to a modification. As illustrated in FIG. 2, as with the superconducting wire 10, a superconducting wire 11 according to the modification includes the MgB$_2$ filament 1, the base material 2, the high-thermal expansion metal 3, and the stabilizing material 4.

The superconducting wire 11 according to the modification is different from the superconducting wire 10 in that a bundling material (pipe material) 5 is provided to bundle the multi-filament base material 2 (a plurality of undepicted metal pipes to accommodate the filaments 1) between the base material 2 and the high-thermal expansion metal 3.

The bundling material 5 is provided so as to cover the periphery of the base material 2 along the length of the superconducting wire 11. As illustrated in FIG. 2, the superconducting wire 11 is formed such that the periphery of the bundling material 5 is covered with the high-thermal expansion metal 3, and the periphery of the high-thermal expansion metal 3 is covered with the stabilizing material 4.

The bundling material 5 is formed of a metal pipe that can bundle undepicted metal pipes each accommodating the filament 1. The bundling material 5 makes it possible to prevent dispersion of the metal pipe accommodating the filament 1 or breakage of the filament 1 even if the high-thermal expansion metal 3 and the stabilizing material 4 are removed during making the superconducting joint of the superconducting wire 11 having the multi-filament wire structure.

As with the base material 2, the bundling material 5 can be formed of iron, niobium, tantalum, nickel, titanium, or an alloy of such a metal. Iron or niobium is preferable as a material of the bundling material 5. Using such a bundling material 5 allows wire-drawing to be easily performed. Further, the high-thermal expansion metal 3 can appropriately apply compressive force, which is caused by the thermal expansion difference, to the core after the heat treatment for generating MgB$_2$.

For the superconducting wire 10 or 11, since the high-thermal expansion metal 3 is used for the sheath covering the core, large residual compressive stress can be added to the MgB$_2$ filament 1 to expand the irreversible tensile strain of the filament 1 and in turn to reduce the reversible bending radius of the superconducting wire 10 or 11. Even if the MgB$_2$ filament is not disposed at the center of the superconducting wire or is not narrowed, the irreversible tensile strain of the filament 1 is large, and thus the bending radius can be reduced to a practical value without greatly reducing the critical current.

Specifically, using the high-thermal expansion metal 3 for the sheath covering the core can adjust the reversible bending radius, which means a limit to what the superconducting properties are not reduced, to 100 mm or less assuming the diameter of the superconducting wire 10 or 11 using the $MgB_2$ filament is 1.5 mm. The superconducting wire is thus allowed to be bent with a large curvature at normal temperature or a very low temperature equal to or lower than the critical temperature, which increases the degree of freedom of winding into a coil shape or routing, for example.

For the superconducting wire 10 or 11, the stabilizing material 4 is disposed on the outer side with respect to the filament 1, and thus copper, which is an inhibitor blocking generation of $MgB_2$, can be securely removed during superconducting joint making. Further, since the stabilizing material 4 forms the sheath covering the core, the sectional area can be easily expanded. The stabilizing material 4 can appropriately bypass a current from the filament 1, removability of the inhibitor during superconducting joint making and thermal stability of the superconductor can be achieved together.

In FIGS. 1 and 2, the superconducting wire 10 or 11 includes a plurality of filaments 1, the peripheries of which are each covered with the base material 2, and is thus provided as a wire having a multi-filament wire structure. The multi-filament wire structure can suppress hysteresis loss and increase the filling factor of the superconductor using the filament 1 having a narrow wire diameter. However, the superconducting wire 10 or 11 can also have a single-filament wire structure including one filament 1 having the periphery covered with the base material 2.

In FIGS. 1 and 2, the superconducting wire 10 or 11 is provided in a form of a round wire, and includes 18 filaments 1 each having a sectional shape being a roughly trapezoidal shape. However, the superconducting wire 10 or 11 can be provided to have an appropriate sectional shape such as a polygonal shape including a rectangular shape, a hexagonal shape, and a rectangular wire shape. The superconducting wire 10 or 11 can also have a multi-filament wire structure including an optional number of filaments 1. The filament 1 can have an appropriate sectional shape such as a circular shape, a rectangular shape, and a polygonal shape.

Method for Manufacturing Superconducting Wire

A method for manufacturing the superconducting wire is now described. The following description is given with an exemplary method in which the superconducting wire having a multi-filament wire structure as illustrated in FIGS. 1 and 2 is manufactured using the in situ method.

The superconducting wire 10 or 11 including the $MgB_2$ filament 1, the base material 2, the high-thermal expansion metal 3, and the stabilizing material 4 can be manufactured by a method including a precursor preparing step, a first wire-drawing step, a compounding step, a second wire-drawing step, and a heat treatment step.

In the precursor preparing step, a mixed powder, which is a mixture of magnesium powder, boron powder, and an additive used as necessary, is packed in a barrier material pipe (first metal pipe) formed of a barrier material. The barrier material pipe is a metal pipe formed of the barrier material that obstructs the inhibitor blocking generation of $MgB_2$, i.e., formed of a metal to be the base material 2 of the superconducting wire 10 or 11.

The mixed powder is prepared by weighing the magnesium powder and the boron powder being materials of $MgB_2$ such that the molar ratio of Mg to B is roughly 1:2, pulverizing the weighed powders, and mixing the pulverized powders. The mixed powder can contain an additive such as a carbon source as necessary. In case of manufacturing the superconducting wire 10 or 11 having the multi-filament wire structure, the mixed powder is packed in each of the barrier material pipes.

The material powder and the mixed powder are each preferably handled in inert-gas atmosphere such as nitrogen or argon atmosphere or in non-oxidizing atmosphere such as vacuum atmosphere. The oxygen amount and the water amount in the atmosphere are each preferably 10 ppm or less. The material powder and the mixed powder can each be mixed by, for example, a ball mill, a planetary ball mill, a V type mixer, or a mortar.

Further, the material powder and the mixed powder can each be mixed by a mechanical milling method. In the mechanical milling method, particles of the material powder or the mixed powder are collided violently against media such as zirconia balls and/or an inner wall of a pot and thus crushed and mixed while being subjected to hard working. In case of using the mechanical milling method, collision energy is preferably applied to a degree where $MgB_2$ is not clearly generated. It is to be noted that "$MgB_2$ is not clearly generated" means that a $MgB_2$ peak is not substantially found in powder X-ray diffraction.

In the mechanical milling method, B particles enter spaces between Mg particles, resulting in a powder structure with a high degree of mixing, in which B is finely dispersed and encapsuled in a Mg matrix. It is therefore possible to produce the filament 1 with a large number of bonds between $MgB_2$ particles and having a high packing factor.

Subsequently, the barrier material pipe (first metal pipe) filled with the mixed powder is subjected to wire-drawing in the first wire-drawing step. The wire-drawing can be performed by drawing, extrusion, swaging, cassette-rolling, groove-rolling, and the like. The wire-drawing can be performed using a drawbench, a hydrostatic extruder, a wire drawing machine, a swager, a cassette roller dice, a groove roll, or the like.

Wire-drawing of the barrier material pipe is preferably performed with a reduction ratio per pass of 8 to 12%. Intermediate anneal can be performed as necessary during wire-drawing of the barrier material pipe. The wire-drawing of the barrier material pipe can be performed using a processing method, in which a portion directly in contact with the wire is not fixed and rotatable. Using such a processing method can provide a filament 1 with a high packing factor because the powder is less damaged and densified through compression.

Subsequently, the barrier material pipe (first metal pipe) subjected to wire-drawing is accommodated in a sheath pipe (second metal pipe) to produce a composite wire in the compounding step. The sheath pipe is a metal pipe formed of a metal to be the sheath covering the core of the superconducting wire 10 or 11.

In case of manufacturing the superconducting wire 10 as illustrated in FIG. 1, a composite pipe having a two-layer structure or a multiple pipe having a double structure can be used as the sheath pipe.

A usable composite pipe having the two-layer structure includes a composite pipe including a high-thermal expansion metal layer formed of the high-thermal expansion metal 3 and a stabilizing material layer formed of the stabilizing material 4 covering the periphery of the high-thermal expansion metal layer. The stabilizing material layer may be formed of either cladding or plating.

A usable multiple pipe having the double structure includes a multiple pipe including a high-thermal expansion metal pipe formed of the high-thermal expansion metal 3 accommodated in a stabilizing material pipe formed of the stabilizing material 4.

In case of manufacturing the superconducting wire 11 as illustrated in FIG. 2, a composite pipe having a triple structure or a multiple pipe having a triple structure can be used as the sheath pipe.

A usable composite pipe having the three-layer structure includes a composite pipe further including a bundling material layer (inner layer) on an inner side with respect to the high-thermal expansion metal 3 of the composite pipe having the two-layer structure including the high-thermal expansion metal layer formed of the high-thermal expansion metal 3 and the stabilizing material layer formed of the stabilizing material 4 covering the periphery of the high-thermal expansion metal layer. Alternatively, a usable composite pipe includes a composite pipe further including a bundling material layer (inner layer) on an inner side with respect to the high-thermal expansion metal 3 of the multiple pipe having a double structure formed by accommodating the high-thermal expansion metal pipe formed of the high-thermal expansion metal 3 in the stabilizing material pipe formed of the stabilizing material 4. The bundling material layer is a metal layer formed of a metal to be the bundling material 5 of the superconducting wire 11.

A usable multiple pipe having the triple structure includes a multiple pipe, in which a bundling material pipe (inner pipe) is further accommodated in the composite pipe having the two-layer structure including the high-thermal expansion metal layer formed of the high-thermal expansion metal 3 and the stabilizing material layer formed of the stabilizing material 4 covering the periphery of the high-thermal expansion metal layer. Alternatively, the usable multiple pipe includes a multiple pipe including the bundling material pipe (inner pipe) further accommodated in the multiple pipe having the double structure, in which the high-thermal expansion metal pipe formed of the high-thermal expansion metal 3 is accommodated in the stabilizing material pipe formed of the stabilizing material 4. The bundling material pipe is a metal pipe formed of a metal to be the bundling material 5 of the superconducting wire 11.

In case of manufacturing the superconducting wire 10 or 11 having the multi-filament wire structure, the respective barrier material pipes are preferably accommodated in the sheath pipe so as to be arranged at equal intervals along the circumferential direction of the sheath pipe. Along the radial direction of the sheath pipe, the barrier material pipes are accommodated such that each barrier material pipe is in tight contact with the high-thermal expansion metal 3 after wire-drawing of the composite wire. A center material formed of the same material as the barrier material pipe can be disposed at the center of the sheath pipe as necessary.

Subsequently, the composite wire including the barrier material pipe (first metal pipe) accommodated in the sheath pipe (second metal pipe) is subjected to wire-drawing in the second wire-drawing step. The wire-drawing can be performed by drawing, extrusion, swaging, cassette-rolling, groove-rolling, and the like. The wire-drawing can be performed such that diameter of the superconducting wire 10 or 11 is reduced to, for example, 0.3 to 2.0 mm, 0.5 to 1.5 mm, or 1.5 to 2.0 mm depending on applications.

In case of manufacturing the superconducting wire 10 or 11 having the multi-filament wire structure, the superconducting wire 10 or 11 subjected to wire-drawing can be subjected to a twisting process. A twisted structure can reduce a coupling current. The twist pitch can be adjusted to 10 to 100 mm, for example.

Subsequently, the composite wire is heat-treated to generate $MgB_2$ in the heat treatment step. Through the heat treatment, the superconducting wire 10 or 11 is provided with the $MgB_2$ filament 1 being sintered. Compressive strain caused by the thermal expansion difference is applied from the high-thermal expansion metal 3 to the core during cooling to room temperature or the critical temperature or lower after the heat treatment, and thus residual compressive strain is added to the filament 1.

Heat treatment atmosphere is preferably inert-gas atmosphere such as nitrogen or argon atmosphere or non-oxidizing atmosphere such as vacuum atmosphere. The oxygen amount and the water amount in the atmosphere are each preferably 10 ppm or less. The heat treatment can be performed while the composite wire subjected to wire-drawing is wound on a bobbin or the like after being covered by an insulating material such as fiber glass as necessary. In case of using, for example, enamel as the insulating material, insulation treatment is performed after the heat treatment.

Heat treatment temperature is, for example, 550 to 800° C., preferably 560 to 700° C., and more preferably 580 to 620° C. When the heat treatment temperature is 550° C. or higher, as the heat treatment temperature increases, a generation reaction of $MgB_2$ is promoted due to diffusion of Mg particles toward B particles, and an increased temperature difference is applied to the high-thermal expansion metal 3. When the heat treatment temperature is 800° C. or lower, as the heat treatment temperature decreases, grain growth of $MgB_2$ is more suppressed and density of grain boundaries to be pinning centers increases, resulting in a high critical current density. When the heat treatment temperature is 580 to 620° C., high critical current density and small reversible bending radius can be satisfactorily achieved together.

Heat treatment time is, for example, several dozen minutes to several dozen hours, preferably 2 to 16 hr, and more preferably 3 to 12 hr. The heat treatment time of 3 hr or more typically allows a sufficient amount of $MgB_2$ to be generated. The heat treatment time of 12 hr or less suppresses grain growth of $MgB_2$ and increases density of grain boundaries to be pinning centers, resulting in a high critical current density.

The engineering critical current density Je per superconducting wire given after the heat treatment is expressed by Numerical Formula (II), where F represents the filling factor [%] of sectional area of the $MgB_2$ filament to sectional area of the superconducting wire, and Jc represents the critical current density [A/mm$^2$] of the $MgB_2$ filament.

$$Je = F \times Jc \qquad (II)$$

The critical current density Jc of the $MgB_2$ filament varies depending on processing or a heat treatment condition in a manufacturing process.

The filling factor of sectional area of the $MgB_2$ filament to sectional area of the superconducting wire given after the heat treatment is preferably 20% or more, more preferably 25% or more. The maximum of the filling factor of the $MgB_2$ filament is typically approximately 30%. The filling factor of the $MgB_2$ filament of 20% or more secures a high engineering critical current density Je while reducing the reversible bending radius.

Other Configurations of Superconducting Wire

Figure 3:
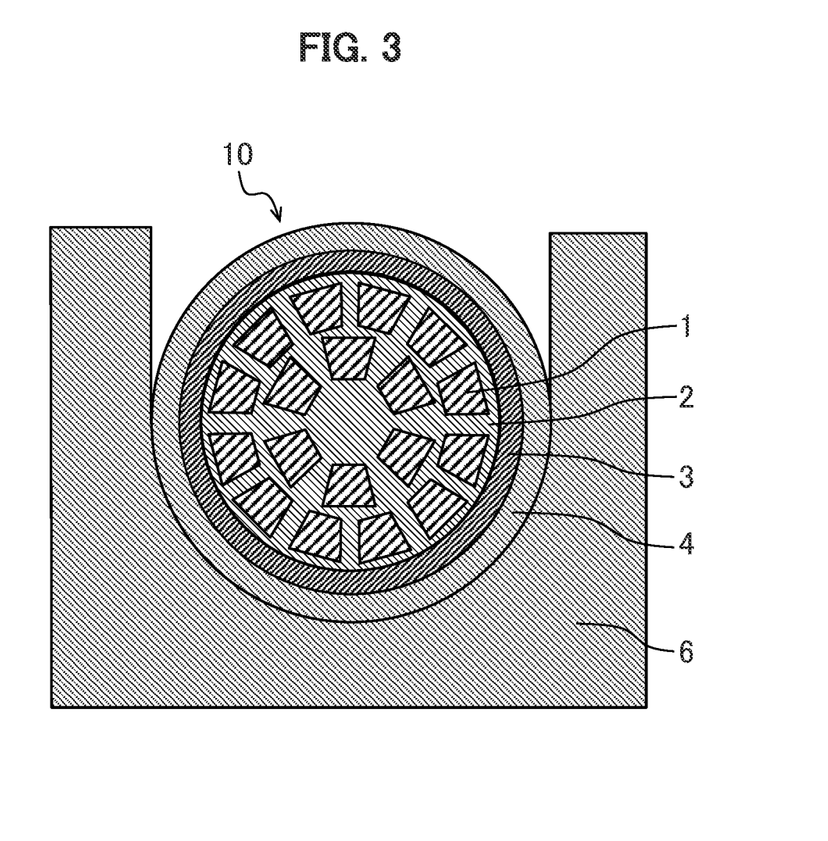
FIG. 3 is a sectional diagram schematically illustrating a superconducting wire in a form integrated with a stabilizing material.

FIG. 3 is a sectional diagram schematically illustrating a superconducting wire in a form integrated with a stabilizing material. As illustrated in FIG. 3, the superconducting wire 10 including the $MgB_2$ filament 1, the base material 2, the high-thermal expansion metal 3, and the stabilizing material 4 can integrally include a stabilizing member 6 stabilizing superconductivity on the outer side of the stabilizing material 4 forming the sheath.

In FIG. 3, the stabilizing member 6 is provided in a gantry shape in a cross-sectional view perpendicular to the longitudinal direction of the superconducting wire 10. The superconducting wire 10 is loaded inside the stabilizing member 6 having the gantry shape. The stabilizing member 6 covers the periphery of the superconducting wire 10 from three directions while being in contact with the outer circumferential surface of the superconducting wire 10. The superconducting wire 10 may or may not be bonded to the stabilizing member 6, for example, by welding or soldering, or with an adhesive.

The stabilizing member 6 is formed of a good conductor having a low resistivity and a high heat conductivity, and thermally stabilizes superconductivity of the filament 1 and suppresses quench and thermal runaway of a superconductor. As with the stabilizing material 4, the stabilizing member 6 can be formed of copper, aluminum, silver, gold, or an alloy of such a metal. Material of the stabilizing member 6 preferably includes copper, more preferably oxygen-free copper.

The stabilizing member 6 may be provided over the full length of the superconducting wire 10, or may be provided over a partial length of the superconducting wire 10. Although having the gantry shape in FIG. 3, the stabilizing member 6 can have an appropriate shape such as an L shape in the cross-sectional view perpendicular to the longitudinal direction of the superconducting wire 10.

When such a stabilizing member 6 is provided, the sectional area of the conductor, i.e., the total sectional area of the stabilizing material 4 and the stabilizing member 6, in a cross-sectional view perpendicular to the longitudinal direction of the superconducting wire 10 can be increased regardless of a cross-sectional structure of the superconducting wire 10. In production of the superconducting wire 10, fixing the sectional area of the stabilizing material 4 forming the sheath enables efficient mass production. The stabilizing member 6 having an optional sectional area can be integrated with a basic structure having the fixed sectional area of the stabilizing material 4, which makes it possible to meet various requirements of thermal stability while reducing material cost. For the superconducting wire 11, the stabilizing member 6 can also be provided as with the superconducting wire 10.

Superconducting Wire Joint

Figure 4:
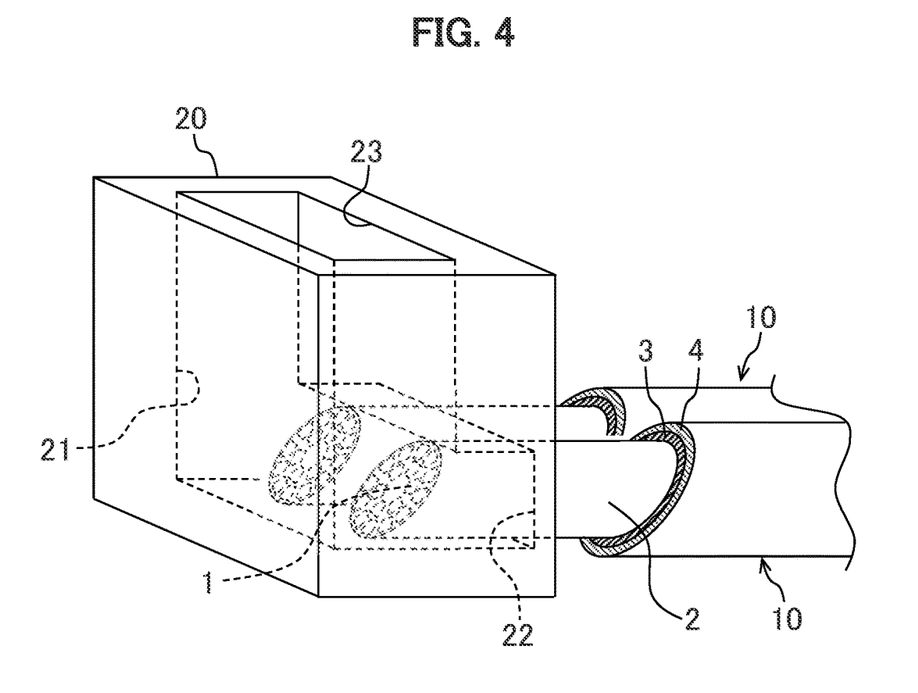
FIG. 4 is a perspective diagram schematically illustrating a joint portion between superconducting wires.

FIG. 4 is a perspective diagram schematically illustrating a joint portion between superconducting wires. As illustrated in FIG. 4, the superconducting wire 10 including the $MgB_2$ filament 1, the base material 2, the high-thermal expansion metal 3, and the stabilizing material 4 can be superconductively joined to another superconductor by forming $MgB_2$ to be a joint portion by sintering the material powders. For the superconducting joint between the superconducting wires 10, a metal container 20 can be used to sinter the $MgB_2$ to be the joint portion.

The metal container 20 has a cavity 21 for forming the $MgB_2$ to be the joint portion, an insertion port 22 for inserting the superconducting wire 10 into the cavity 21, and an opening 23 to allow packing and pressurizing of the material powder in/to the cavity 21. The metal container 20 is formed of a metal that is less likely to react with Mg and B. The metal container 20 can be formed of iron, niobium, tantalum, nickel, or an alloy of such a metal.

For the superconducting joint, the stabilizing material 4 and the like on an end portion of the superconducting wire 10 are beforehand removed. Removing the stabilizing material 4 and the like prevents a reaction of the material powder with the inhibitor blocking generation of $MgB_2$. A usable method for removing the stabilizing material 4 and the like includes, for example, chemical polishing and mechanical polishing. The high-thermal expansion metal 3 may be removed together with the stabilizing material 4, or may not be removed when the high-thermal expansion metal 3 has a chemical composition not containing a large quantity of inhibitors.

After removing the stabilizing material 4 and the like on the end portion of each superconducting wire 10, the end portion of the superconducting wire 10 is inserted into the cavity 21 from the insertion port 22. Mixed powder as a mixture of magnesium powder and boron powder is then packed in the cavity 21 from the opening 23, and an undepicted pressurizing pin is inserted through the opening 23. The pin is pressed in by a pressing machine to pressurize the mixed powder packed in the cavity 21, so that the periphery of the end portion of the superconducting wire 10 is consolidated.

After pressurizing the packed mixed powder, the mixed powder is subjected to heat treatment to form a sintered body of the $MgB_2$ to be the joint portion. The heat treatment of the mixed powder can be performed by, for example, an electric furnace while the pin is still inserted or while the opening is sealed to prevent volatilization or effluence of Mg. The opening can be sealed using appropriate means, such as magnesium powder itself, a magnesium lump, a heat-resistant adhesive, and a screw cramp.

Heat treatment temperature of the joint portion is, for example, 500 to 900° C., preferably 550 to 800° C., more preferably 560 to 700° C., and further more preferably 580 to 620° C. Heat treatment atmosphere of the joint portion is preferably inert-gas atmosphere or non-oxidizing atmosphere such as vacuum atmosphere.

The heat treatment provides a joint portion, in which the stabilizing material 4 or both the high-thermal expansion metal 3 and the stabilizing material 4 is/are removed from at least one end portion of the superconducting wire 10, the filament 1 on the end portion is integrated with the sintered body formed of $MgB_2$, and the superconducting wire 10 is superconductively joined to another superconducting wire 10 (another superconductor) via the sintered body.

The superconducting wire 10 is thus superconductively joined through formation of the joint portion via the $MgB_2$ bulk and then cooled together with the metal container 20 to the critical temperature or lower, and thus can be used. The metal container 20 may be connected to a cooling path formed of oxygen-free copper, for example. The metal container 20 or the joint portion formed within the metal container 20 can be conduction-cooled via such a cooling path.

Figure 5:
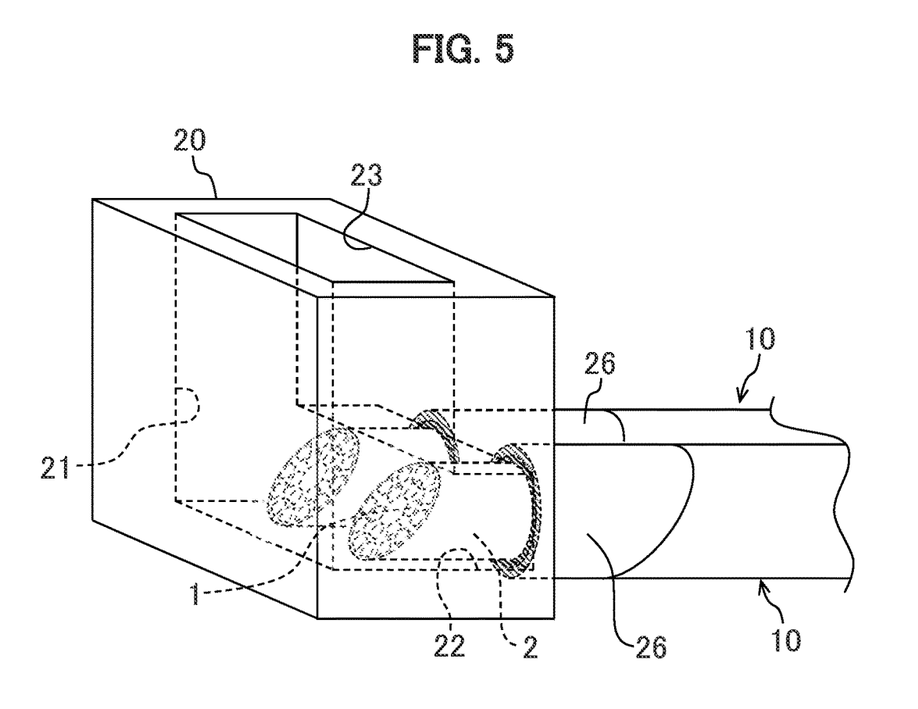
FIG. 5 is a perspective diagram schematically illustrating a joint portion between superconducting wires each additionally having a stabilizing member.

FIG. 5 is a perspective diagram schematically illustrating a joint portion between superconducting wires each additionally having a stabilizing member. As illustrated in FIG. 5, the superconducting wire 10 is superconductively joined to another superconducting wire 10 (another superconductor), and then a stabilizing member 26 for stabilizing superconductivity can be added to the end portion (see FIG. 4) of the superconducting wire 10, from which the stabilizing material 4 and the like are removed, so as to be in contact with the superconducting wire 10.

In FIG. 5, the stabilizing member 26 is provided in a sheath shape for the superconducting wire 10, from which the stabilizing material 4 and the like are removed, so as to cover the exposed core. The sheath-shaped stabilizing member 26 covers the periphery of the core of the superconducting wire 10 from the tip-surfaces of the stabilizing material 4 and the like, of which the portions near the metal container 20 are removed, to the surface having the insertion port 22 of the metal container 20.

The stabilizing member 26 is formed of a good conductor having a low resistivity and a high heat conductivity, and thermally stabilizes superconductivity of the filament 1 and suppresses quench and thermal runaway of the superconductor. As with the stabilizing material 4, the stabilizing member 26 can be formed of copper, aluminum, silver, gold, or an alloy of such a metal. A preferable material of the stabilizing member 26 includes copper or aluminum.

Adding such a stabilizing member 26 can increase sectional area of the conductor in a cross-sectional view perpendicular to the longitudinal direction of the superconducting wire 10 at the joint portion of the superconducting wire 10. In the joint portion, since the stabilizing material 4 is removed from the end portion of the superconducting wire 10, thermal stability of a superconductor is locally reduced. Such poor thermal stability can be compensated by adding the stabilizing member 26 to that local region.

In FIGS. 4 and 5, the insertion port 22 has a structure to allow two superconducting wires 10 to be inserted in parallel therethrough. However, any number of superconducting wires 10 can be superconductively joined. The insertion port 22 can have a structure to allow any number of wires to be inserted in correspondence to the number of the superconducting wires 10 to be superconductively joined together. The insertion port can be provided individually in, for example, two opposed surfaces of the metal container. Such a structure enables superconducting joint in a linear manner such that tip ends of the superconducting wires 10 are opposed to each other.

In FIGS. 4 and 5, the opening 23 is provided along a direction perpendicular to the direction, along which the insertion port 22 is provided, with respect to the cavity 21. However, the opening 23 can be provided along an appropriate direction with respect to the cavity 21 as long as the powder can be packed in the opening 23. The insertion port for inserting the superconducting wire 10 and the opening for packing and pressurizing the material powder need not be necessarily individually provided, and one opening may be provided for both insertion of the superconducting wire 10 and packing/pressurizing of the material powder.

In FIGS. 4 and 5, the superconducting wires 10 having the same configuration are superconductively joined together. However, the superconducting wire 10 can be superconductively joined to another optional superconductor. Specifically, a superconducting wire 10 can be formed such that the stabilizing material 4 or both the high-thermal expansion metal 3 and the stabilizing material 4 is/are removed from at least one end portion of the superconducting wire 10, the filament 1 on the end portion is integrated with a sintered body formed of $MgB_2$, and the superconducting wire is superconductively joined to another superconductor via the sintered body.

In FIG. 5, the stabilizing member 26 is provided in a sheath shape for the superconducting wire 10, from which the stabilizing material 4 and the like are removed, so as to cover the exposed core. However, the stabilizing member 26 can be provided in an appropriate shape, such as a gantry shape, a block shape, a bead shape, and a ribbon shape so as to cover at least part of the periphery of the core. The superconducting wire 10 may or may not be bonded to the stabilizing member 26, for example, by welding or soldering, or with an adhesive.

According to the above superconductively joined superconducting wire 10 or the superconducting joint method, since the $MgB_2$ to be the joint portion is sintered in the same way as the in situ method, a large amount of $MgB_2$ are bonded together in the vicinity of the boundary between the sintered joint portion and the end portion of the superconducting wire 10, leading to excellent electrical conduction performance. The superconducting wire 10 can be superconductively joined via the $MgB_2$ bulk and thus can be energized at high temperature compared with existing superconducting solder, so that the high critical temperature of $MgB_2$ can be fully used.

The above superconductively-joined superconducting wire 10 or the superconducting joint method can be used for a joint portion of an application device such as, for example, a superconducting coil and a superconducting magnet. The superconducting joint between the superconducting wires 10 provides, for example, a superconducting wire, a superconducting coil, and a superconducting magnet, each including a joint portion formed of $MgB_2$ and a bent portion having a small bending radius. An application device using the superconducting wire 10 is therefore increased in degree of freedom of production, disposition, a device configuration, and wiring. The superconducting joint of the superconducting wire 11 is also enabled as with the superconducting wire 10.

Application Device

Figure 6:
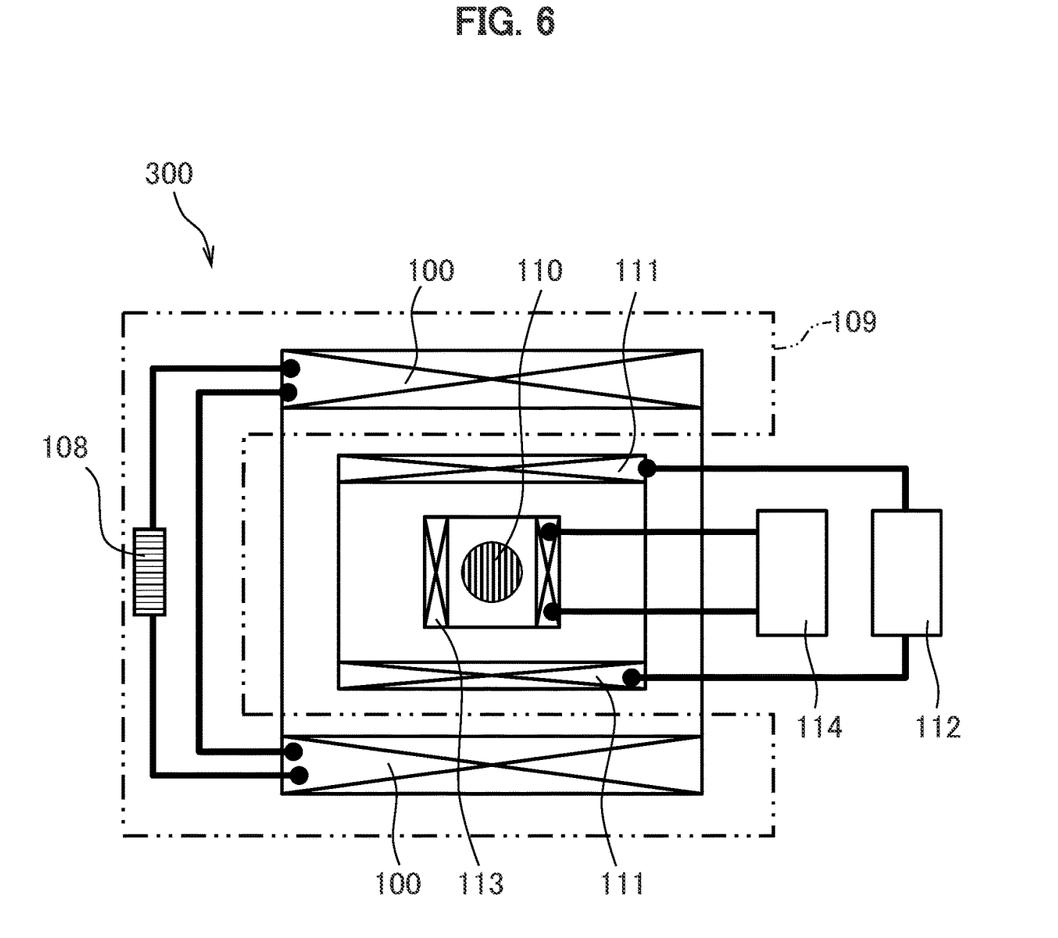
FIG. 6 illustrates a configuration of a magnetic resonance imaging (MRI) device.

FIG. 6 illustrates a configuration of an MRI device. As illustrated in FIG. 6, an MRI device 300 includes a superconducting coil 100, a persistent current switch 108, a freezing container 109, a gradient magnetic field coil 111, a gradient magnetic field amplifier 112, a radio frequency (RF) antenna 113, and an RF transmitter receiver 114.

The MRI device 300 illustrated in FIG. 6 is shown as one example of the MRI device using the superconducting wire, and the superconducting wire 10 or 11 can be used in a device having an appropriate configuration using a superconductor. In FIG. 6, the superconducting coil 100 is housed together with the persistent current switch 108 in the freezing container 109. The superconducting coil 100 and the persistent current switch 108 are cooled by a coolant or a freezer.

An exciting current flows through the superconducting coil 100 in a circuit formed by the superconducting coil 100 and the persistent current switch 108 while the persistent current switch 108 is off. When the persistent current switch 108 is switched to on, a persistent current flows in the circuit. The persistent current generates a static magnetic field having high temporal stability at a position of a measurement object 110. Higher intensity of the static magnetic field increases nuclear magnetic resonance frequency, and in turn improves frequency resolution.

The gradient magnetic field coil 111 receives a current, which changes over time as necessary, from the gradient magnetic field amplifier 112, and generates a magnetic field having spatial distribution at the position of the measurement object 110. The RF antenna 113 applies an oscillating magnetic field at the nuclear magnetic resonance frequency to the measurement object 110. The RF transmitter receiver 114 receives a resonance signal generated from the measurement object 110 and enables tomographic image diagnosis of the measurement object 110.

The superconducting wire 10 or 11 including the $MgB_2$ filament 1, the base material 2, the high-thermal expansion metal 3, and the stabilizing material 4 can be used for the superconducting coil 100, the persistent current switch 108, and the circuit, in which the persistent current flows, of such an MRI device 300. The superconducting coil 100, the persistent current switch 108, and the circuit, in which the persistent current flows, can be superconductively joined to each other using the superconducting wires that are superconductively joined together or the superconducting joint method as illustrated in FIGS. 4 and 5.

The superconducting wire 10 or 11 including the $MgB_2$ filament 1, the base material 2, the high-thermal expansion metal 3, and the stabilizing material 4 can also be used for a coil for generating a static magnetic field of a nuclear magnetic resonance (NMR) device. The coil for generating the static magnetic field can be superconductively joined to another superconductor using the superconducting wires that are superconductively joined together or the superconducting joint method as illustrated in FIGS. 4 and 5.

In the application device such as the MRI device or the NMR device using such a superconducting wire 10 or 11, the degree of freedom of winding into a coil shape or routing increases due to the superconducting wire 10 or 11 having a small reversible bending radius, and thus a freezing container or the entire device can be reduced in size. In addition, since the superconducting wire can be bent at a small bending radius at a lead-out portion or the like of the superconducting coil, coils are concentrically disposed and superconductively joined together without significant disturbance, which is appropriate for multiplexing of superconducting coils.

Although one embodiment of the invention has been described hereinbefore, the invention should not be limited thereto, and various modifications or alterations can be made within the scope without departing from the gist of the invention. For example, the invention is not necessarily limited to an embodiment having all the configurations of the above-described embodiment. A configuration of one embodiment can be partially substituted for another configuration, a configuration of one embodiment can be added to another embodiment, and a configuration of one embodiment can be partially omitted.

LIST OF REFERENCE SIGNS

1 Filament
2 Base material
3 High-thermal expansion metal
4 Stabilizing material
5 Bundling material (pipe material)
6 Stabilizing member
10 Superconducting wire
11 Superconducting wire
20 Metal container
21 Cavity
22 Insertion port
23 Opening
26 Stabilizing member
100 Superconducting coil
108 Persistent current switch
109 Freezing container
111 Gradient magnetic field coil
112 Gradient magnetic field amplifier
113 RF antenna
114 RF transmitter receiver
300 MRI device

The invention claimed is:
1. A superconducting wire, comprising:
   a filament formed of $MgB_2$;
   a base material covering a periphery of the filament;
   a high-thermal expansion metal covering a periphery of the base material, the high-thermal expansion metal being stainless steel; and
   a stabilizing material covering a periphery of the high-thermal expansion metal and stabilizing superconductivity, the stabilizing material being copper,
   wherein the high-thermal expansion metal has a higher thermal expansion coefficient at room temperature than the $MgB_2$ and the base material.
2. The superconducting wire according to claim 1, further comprising:
   a multi-filament wire structure including a plurality of the filaments each having a periphery covered with the base material.
3. The superconducting wire according to claim 2, further comprising:
   a pipe material formed of iron or niobium to bundle the multi-filament base materials between the base materials and the high-thermal expansion metal.
4. The superconducting wire according to claim 1,
   wherein the stabilizing material or both the high-thermal expansion metal and the stabilizing material is/are removed from at least one end portion of the superconducting wire, and
   wherein the filament on the end portion is integrated with a sintered body formed of $MgB_2$, and the superconducting wire is superconductively joined to another superconductor via the sintered body.
5. The superconducting wire according to claim 4,
   wherein a stabilizing member stabilizing superconductivity is added to the end portion from which the stabilizing material is removed so as to be in contact with the superconducting wire.
6. The superconducting wire according to claim 1,
   wherein the base material is iron or niobium.
7. The superconducting wire according to claim 1,
   wherein the high-thermal expansion metal has a thermal expansion coefficient of $14.0 \times 10^{-6}$ °C.$^{-1}$ or more from temperature of heat treatment to generate $MgB_2$ to room temperature.
8. The superconducting wire according to claim 1, further comprising:
   a stabilizing member stabilizing superconductivity on an outer side of the stabilizing material, the stabilizing member covering part of the periphery of the stabilizing material and provided in a gantry shape in a cross-sectional view.
9. A method for manufacturing a superconducting wire, the method comprising the steps of:
   packing a mixed powder being a mixture of magnesium powder and boron powder into a first metal pipe;
   performing wire-drawing on the first metal pipe filled with the mixed powder;
   producing a composite wire by accommodating the first metal pipe subjected to the wire-drawing in a second metal pipe;
   performing wire-drawing on the composite wire; and
   generating $MgB_2$ by performing heat treatment on the composite wire subjected to the wire-drawing,
   wherein the first metal pipe is formed of a metal to be a base material of the superconducting wire,
   the second metal pipe is a composite pipe including a high-thermal expansion metal layer formed of a high- thermal expansion metal being stainless steel and a stabilizing material layer formed of a stabilizing material being copper covering a periphery of the high-thermal expansion metal layer and stabilizing superconductivity, or a multiple pipe including a high-thermal expansion metal pipe formed of the high-thermal expansion metal accommodated in a stabilizing material pipe formed of the stabilizing material stabilizing superconductivity, and the high-thermal expansion metal has a higher thermal expansion coefficient at room temperature than the $MgB_2$ and the metal to be the base material.

10. The method according to claim 9,
wherein the metal to be the base material is iron or niobium.

11. The method according to claim 9,
wherein temperature of the heat treatment is 580 to 620° C.

12. The method according to claim 9,
wherein the composite wire is produced by accommodating a plurality of the first metal pipes subjected to the wire-drawing in the second metal pipe.

13. The method according to claim 9,
wherein the second metal pipe includes an inner layer formed of iron or niobium on an inner side of the composite pipe or the multiple pipe, or includes an inner pipe formed of iron or niobium accommodated in the composite pipe or the multiple pipe.

14. An MRI device, comprising the superconducting wire according to claim 1.

* * * * *